United States Patent
Chen et al.

(10) Patent No.: US 10,095,603 B2
(45) Date of Patent: Oct. 9, 2018

(54) PRE-FETCHING DISASSEMBLY CODE FOR REMOTE SOFTWARE DEBUGGING

(71) Applicant: International Business Machines Corporation, Armonk, NY (US)

(72) Inventors: Xiao Ling Chen, Beijing (CN); Chuan He, Beijing (CN); Yan Huang, Beijing (CN); Jiang Yi Liu, Beijing (CN); Jian Xu, Milton (CA); Chong Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/401,124

(22) Filed: Jan. 9, 2017

(65) Prior Publication Data

US 2018/0196733 A1 Jul. 12, 2018

(51) Int. Cl.
*G06F 11/00* (2006.01)
*G06F 11/36* (2006.01)

(52) U.S. Cl.
CPC ...... *G06F 11/3624* (2013.01); *G06F 11/3664* (2013.01)

(58) Field of Classification Search
CPC ............ G06F 11/3624; G06F 11/3664; G06F 11/362; G06F 11/3628; G06F 11/3632; G06F 11/3636
See application file for complete search history.

(56) References Cited

U.S. PATENT DOCUMENTS

| | | |
|---|---|---|
| 5,452,440 A | 9/1995 | Salsburg |
| 6,065,106 A * | 5/2000 | Deao ................ G01R 31/31705 712/227 |
| 6,941,492 B1 | 9/2005 | Ezra et al. |
| 7,020,768 B2 | 3/2006 | Swaine et al. |
| 7,779,238 B2 | 8/2010 | Kosche et al. |
| 7,814,463 B2 | 10/2010 | Dandoy |
| 8,370,810 B2 | 2/2013 | Oda |
| 8,539,455 B2 | 9/2013 | Berg et al. |
| 8,782,611 B1 | 7/2014 | Kretzler et al. |
| 8,863,088 B2 | 10/2014 | Kratochvil |
| 9,111,038 B2 | 8/2015 | Wisniewski |

(Continued)

FOREIGN PATENT DOCUMENTS

| | | |
|---|---|---|
| GB | 2505564 A | 3/2014 |
| GB | 2505564 B | 1/2015 |

OTHER PUBLICATIONS

Chen et al., "Pre-Fetching Disassembly Code for Remote Software Debugging", U.S. Appl. No. 15/682,597, filed Aug. 22, 2017, 34 pages.

(Continued)

*Primary Examiner* — Bryce P Bonzo
*Assistant Examiner* — Anthony J Amoroso
(74) *Attorney, Agent, or Firm* — Edward J. Wixted, III

(57) ABSTRACT

A method, computer program product and/or system for pre-fetching disassembly code. A breakpoint is set within an application under test (AUT). Setting of the breakpoint triggers pre-fetching of disassembly code associated with the breakpoint. The pre-fetched disassembly code is retained in a store local to a debug analysis system. When runtime processing of the AUT reaches the breakpoint, the debug analysis system retrieves the disassembly code from the local store.

6 Claims, 11 Drawing Sheets

(56) References Cited

U.S. PATENT DOCUMENTS

| | | |
|---|---|---|
| 9,146,832 B2 | 9/2015 | Degenhardt et al. |
| 9,170,922 B1 * | 10/2015 | Lachwani ........... G06F 11/3636 |
| 9,195,476 B2 | 11/2015 | Liem |
| 9,292,413 B2 | 3/2016 | Faillaci, III et al. |
| 2014/0109059 A1 * | 4/2014 | Wisniewski ........ G06F 11/3664 |
| | | 717/125 |
| 2014/0317602 A1 | 10/2014 | Zuo |

OTHER PUBLICATIONS

IBM Appendix P, list of patents and patent applications treated as related, filed herewith, 2 pages.

IBM Knowledge Center, "Debugging a disassembled program", Version 9.0.1, printed on Oct. 13, 2016, 3 pages, <http://www.ibm.com/support/knowledgecenter/SSQ2R2_9.0.1/com.ibm.ent.dbt.zos.doc/topics/eqabug0042.htm>.

IBM Knowledge Center, "Remote debugging", Version 2.0.0, printed on Oct. 13, 2016, 1 page, <http://www.ibm.com/support/knowledgecenter/SSY2VQ_2.0.0/com.ibm.distdebug.doc/debugwks/concepts/cbwremdb.htm>.

\* cited by examiner

PRE-FETCHING DISASSEMBLY CODE FOR REMOTE SOFTWARE DEBUGGING

BACKGROUND OF THE INVENTION

The present invention relates generally to the field of software debugging, and more particularly to remote debugging of computer software applications. Debugging is the process of finding and resolving defects that prevent the correct operation of computer software, or a computer system.

SUMMARY

According to an aspect of the present invention, there is a method, computer program product and/or system for pre-fetching disassembly code that performs the following operations (not necessarily in the following order): (i) receiving a program code data set; (ii) receiving user input including a first breakpoint address; (iii) pre-fetching a first disassembly code segment, based at least in part on the program code data set, and further based at least in part on the first breakpoint address, to produce a pre-fetched first disassembly code segment; (iv) receiving information indicating that execution of the program code data set has reached the first breakpoint address; and (v) sending the pre-fetched first disassembly code segment to a debug analysis system.

DETAILED DESCRIPTION

Embodiments of the present invention improve the process of remote software debugging, by pre-fetching disassembly code of the application under test when a breakpoint is set. During execution of the application under test, when the breakpoint is reached, the pre-fetched disassembly code is available (locally with respect to a debug analysis system, and/or a debug GUI) for analysis. Pre-fetching the code reduces the latency between reaching of a breakpoint during runtime, and availability of the disassembly code for analysis. Pre-fetching the code further reduces network traffic that would otherwise be associated with repeated hits against a breakpoint.

Some embodiments of the present invention may recognize one, or more, of the following facts, potential problems and/or potential areas for improvement with respect to the current state of the art: (i) when an application under test is very large and a graphical user interface (GUI) shows the application's disassembly code, remote debugging may be slow, due in part, to the latency of disassembling the application under test and transmitting the disassembly code, through network communications, to the GUI; and/or (ii) the debug engine may have many actions to take and many data packets may be communicated through the network, which further contributes, at least in part, to the slow response.

Some embodiments of the present invention leverage the fact that disassembly code does not change during the debugging process, unless the application under test is recompiled.

Figure 1:
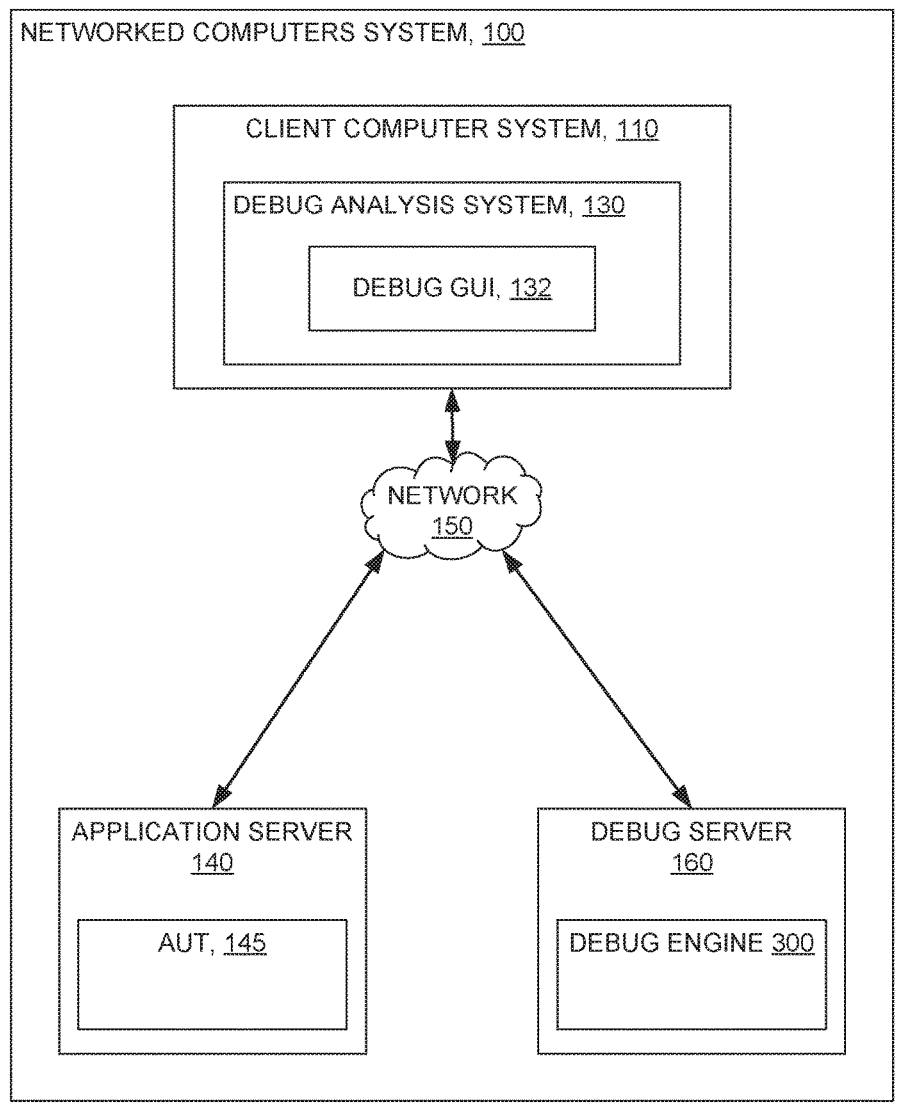
FIG. 1 is a functional block diagram depicting a computing environment in accordance with at least one embodiment of the present invention.

The present invention will now be described in detail with reference to the Figures. FIG. 1 is a functional block diagram depicting networked computers system 100 in accordance with an embodiment of the present invention. Networked computers system 100 includes client computer system 110, which can be any of a desktop computer, a laptop computer, a specialized computer server, or any other computer system known in the art. In some embodiments, client computer system 110 represents a computer system utilizing clustered computers and components to act as a single pool of seamless resources when accessed through network 150. In general, client computer system 110 is representative of any electronic device, or combination of electronic devices, capable of executing machine-readable program instructions, as described in greater detail below with regard to FIG. 12. Networked computers system 100 further includes: debug analysis stem 130; debug GUI 132 (debug graphical user interface); application server computer 140; application under test, AUT 145; debug server computer, 160; and debug engine, 300. It is noted here that throughout this document, references to actions performed by debug GUI 132 may alternatively be performed by debug analysis system 130 or components thereof.

Example Embodiment

Figure 2:
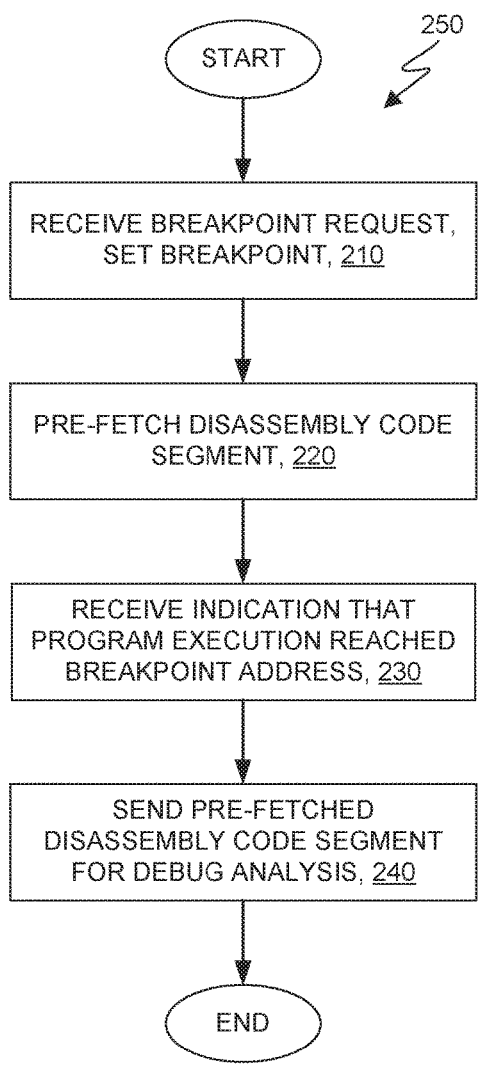
FIG. 2 is a flowchart showing a first embodiment method performed, at least in part, by the first embodiment system.
Figure 3:
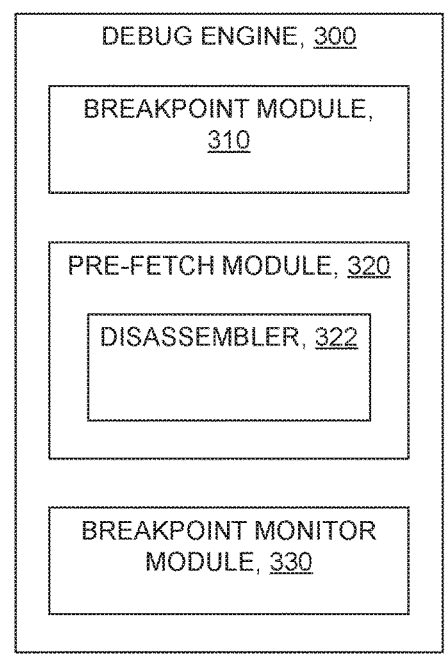
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with reference to FIG. 2 (for the method operation blocks) and FIG. 3 (for the software blocks).

Processing begins at operation 210, where breakpoint module 310 of debug engine 300 receives a request to set a breakpoint at a particular memory address within AUT 145 (application under test) of application server computer 140 (See FIG. 1). Breakpoint module 310 sets the breakpoint at the indicated address.

Processing proceeds at operation 220, where disassembler 322 of pre-fetch module 320 of debug engine 300 generates disassembly code segment 326 based on AUT 145 and the address at which the breakpoint is set. Pre-fetch module 320 stores the disassembly code segment in disassembly code data store 324 of persistent storage 1208 (see FIG. 12). Disassembler 322 is a computer program that translates machine language into assembly language. Disassembly code is an assembly language representation corresponding to a machine language representation of a computer software program. The disassembly code is generated by "reverse assembling" or "disassembling" the machine language code into the disassembly code.

Processing proceeds at operation 230, where breakpoint monitor module 330 of debug engine 300 detects that program execution of AUT 145 stops at the breakpoint that was set in operation 210 above.

Processing proceeds at operation 240 where pre-fetch module 320 retrieves disassembly code segment 326 from disassembly code data store 324 (see FIG. 12) and sends the disassembly code segment to an analysis device. Examples of analysis device include, without limitation: (i) debug GUI 132 of debug analysis system 130 of client computer system 110 of networked computers system 100 (see FIG. 1) for display to a user; and/or (ii) debug analysis system 130. In some embodiments of the present invention, debug analysis system 130 is an automated software analysis system designed and configured to perform software debug analysis with or without involvement of a human user. In the case of (i) above, the disassembly code segment is displayed and available for examination and analysis by a human user, for the purpose of determining a root cause of a defect (bug) in the application under test. In the case of (ii) above, the disassembly code segment is analyzed by an automated system which applies machine logic rules to help determine the root cause of a defect in the application under test. In some cases, the system may direct the focus of analysis to a particular section within the disassembly code segment where the root cause is most likely to be found, thereby assisting a human user in identifying the root cause.

Further Comments and/or Embodiments

In some embodiments of the present invention, when a user sends, via a debug graphical user interface (GUI), and to a debug engine, a request to set a breakpoint in an application under test (AUT), the debug engine sends in reply a data packet that includes pre-fetched disassembly code related to the breakpoint address. The packet further includes other information related to the breakpoint, such as filename, line number, address and so on. The GUI sets a flag to indicate that the pre-fetched disassembly code is "available" for (substantially) immediate display when execution of the AUT reaches the corresponding breakpoint.

When the AUT is executing, and the program counter reaches the breakpoint (or the debug engine stops program execution by step/next), the GUI displays the pre-fetched disassembly code. The GUI does not need to request fetching of the disassembly code at the time the breakpoint is reached, because the code had already been pre-fetched (when the breakpoint was set). Therefore, the latency between reaching the breakpoint (during program execution) and display of the disassembly code is significantly shortened over what it would have been absent the pre-fetching of the code.

A method in some embodiments of the present invention performs operations as discussed below, not necessarily in the order presented. Operations 1 and 2 will now be discussed below, with reference to FIG. 4.

Figure 4:
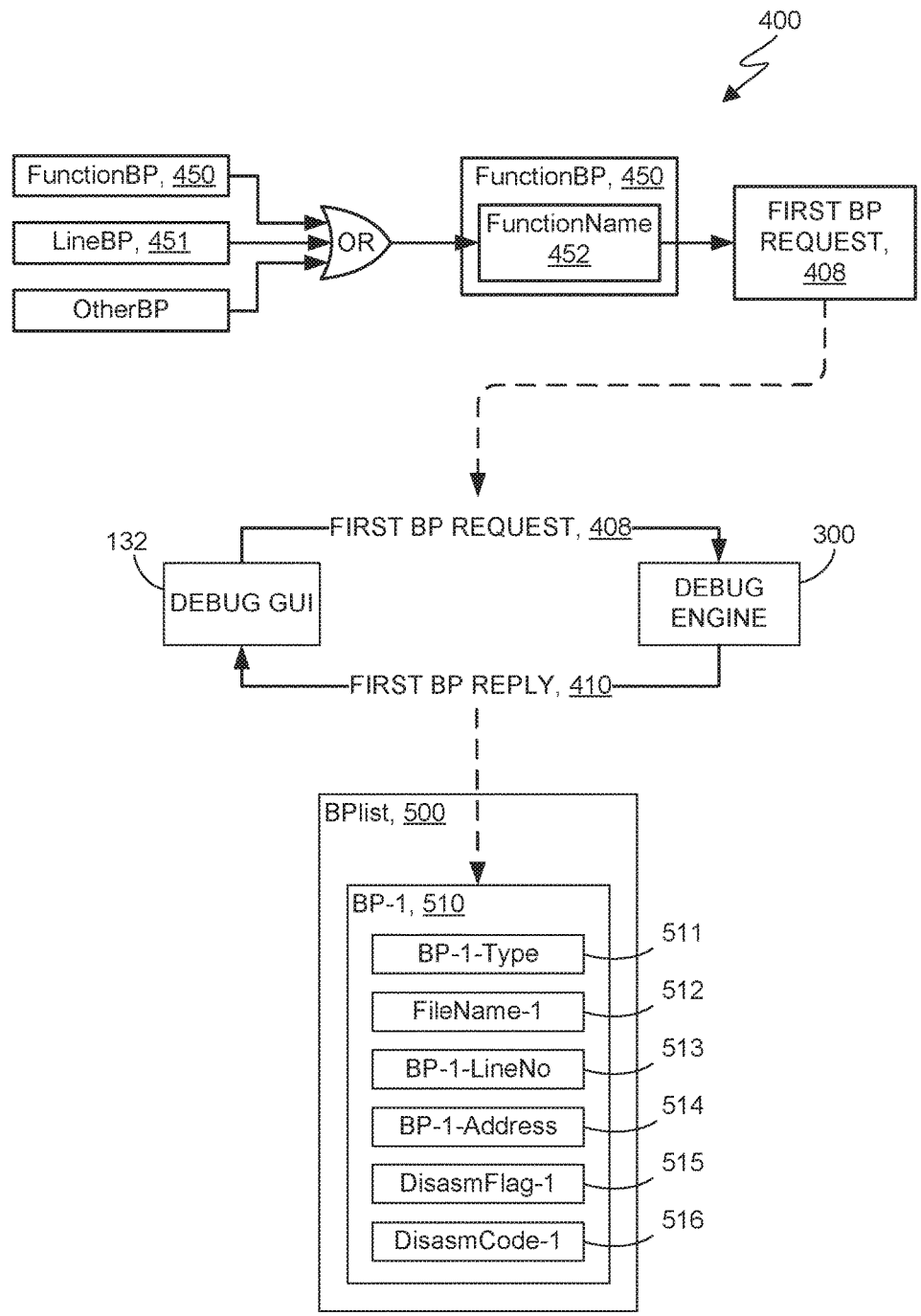
FIG. 4 is a functional block diagram showing a portion of machine logic (for example, software) in accordance with at least one embodiment of the present invention.

Referring now to FIG. 4, functional block diagram 400 illustrates actions that take place with respect to setting a first breakpoint in AUT 145 (application under test, see FIG. 1). GUI 132 receives user input to indicate that a user wants to set a breakpoint in AUT 145. The requested breakpoint may be one of several types including: (i) a function breakpoint (stops program execution at a specified function), for example FunctionBP 450; (ii) a line number breakpoint (stops at a specified line number), for example LineBP 451; (iii) an address breakpoint (stops at the address in memory at which the breakpoint is set); (iv) a conditional breakpoint where program execution stops upon occurrence of a specified event such as (a) reading or writing of a specified memory address, (b) at a specified time, (c) upon a specified user input, etc.; and/or (v) other types of breakpoint now known or to be developed in the future.

In the embodiment of FIG. 4, the user specifies a "function" type of breakpoint, FunctionBP 450. Debug GUI 132 generates, and sends to debug engine 300, first BP request 408. The first BP request includes information to indicate the type of breakpoint requested (FunctionBP 450), the relevant function name (FunctionName 452), and any other information the debug engine needs to properly set the breakpoint.

In response to receiving first BP request 408, debug engine 300 performs actions that include: (i) setting the first breakpoint (not shown in the Figures) in AUT 145 in accordance with information included in the first request; and (ii) pre-fetching disassembly code corresponding to the first breakpoint.

In further response to first BP request 408, debug engine 300 generates, and sends to GUI 132, first BP reply 410. First BP reply 410 includes BP-1 510 which is a data packet of information pertaining to the first breakpoint including at least one of the following: (i) BP-1-Type 511 (to indicate the type of the breakpoint); (ii) FileName-1 512 (filename of the module in which the first breakpoint is set); (iii) BP-1-LineNo 513 (line number at which the first breakpoint is set); (iv) BP-1-Address 514 (memory address at which the first breakpoint is set); (v) DisasmFlag-1 515 (a Boolean flag to keep track of whether the disassembly code corresponding to the first breakpoint is available at GUI 132 for substantially immediate display); and/or (vi) DisasmCode-1 516 (the pre-fetched disassembly code segment corresponding to the first breakpoint). Debug GUI 132 stores BP-1 510 in BPlist 500. Further with respect to item (v) above, DisasmFlag-1 515 may initially be set to FALSE. Later in the process, as described in the paragraph below with respect to FIG. 5, the DisasmFlag-1 may be set to TRUE by debug GUI 132.

Figure 5:
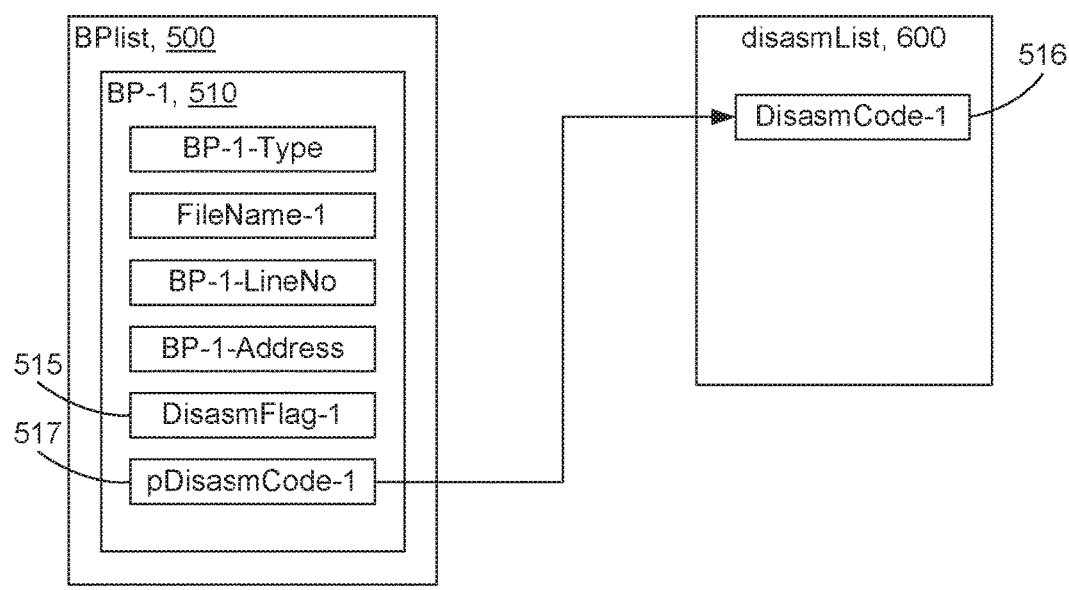
FIG. 5 is a functional block diagram showing a portion of machine logic (for example, software) in accordance with at least one embodiment of the present invention.

Referring now to FIG. 5, debug GUI 132 performs the following actions: (i) marks DisasmCode-1 516 as "available", by setting DisasmFlag-1 515 to "TRUE"; (ii) stores DisasmCode-1 516, and references it as being a member of disasmList 600; and/or (iii) sets a pointer (pDisasmCode-1 517) in BP-1 510, to point to an address in memory where DisasmCode-1 516 is stored.

Figure 6:
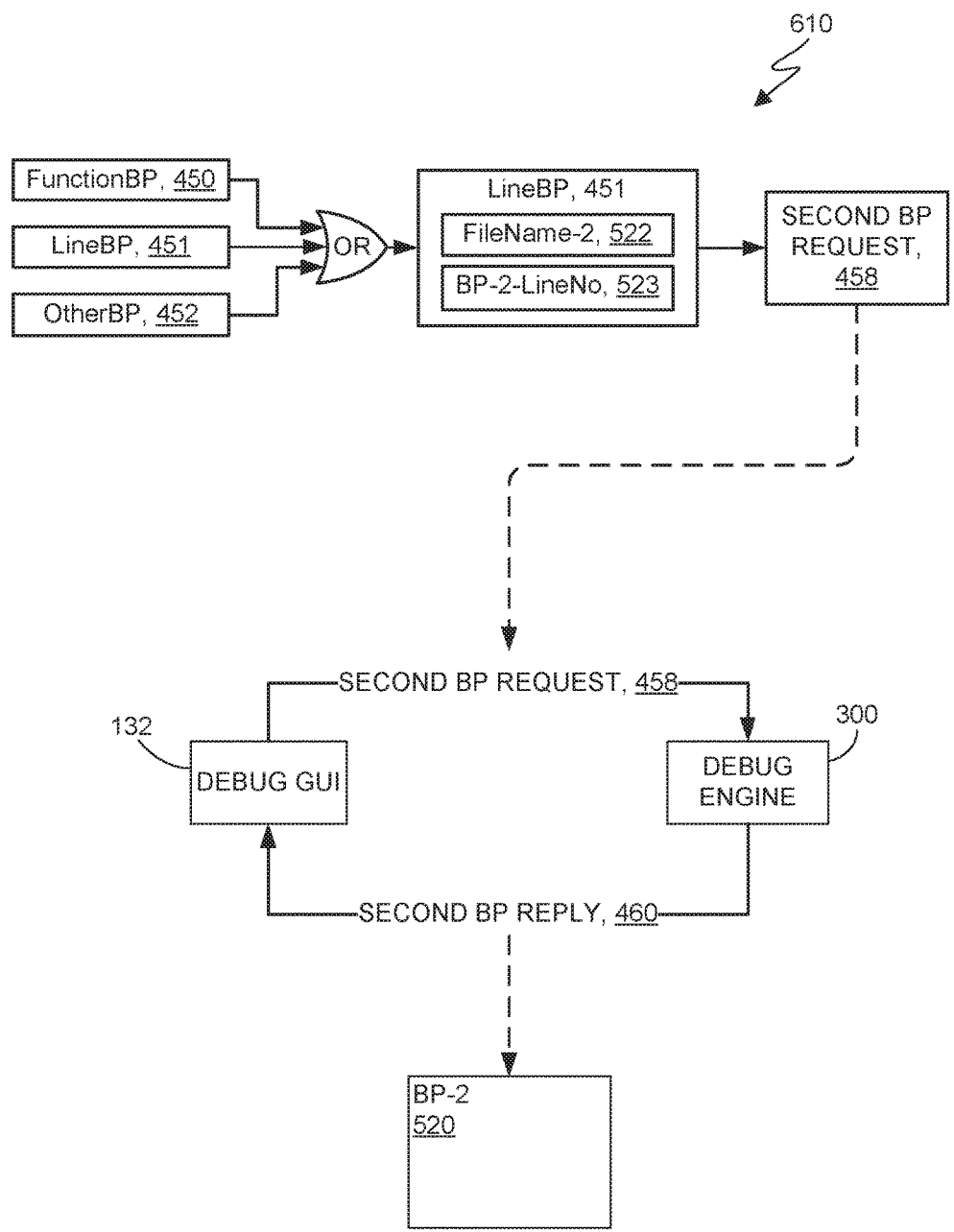
FIG. 6 is a functional block diagram showing a portion of machine logic (for example, software) in accordance with at least one embodiment of the present invention.

Referring now to FIG. 6, functional block diagram 610 illustrates actions that take place with respect to setting a second breakpoint in AUT 145 (see FIG. 1). Debug GUI 132 receives user input to indicate that a user wants to set a second breakpoint in AUT 145. In the embodiment of FIG. 6, the user specifies a "line number" type of breakpoint, (LineBP 451). Debug GUI 132 generates, and sends to debug engine 300, second BP request 458, which includes information to indicate the type of breakpoint requested (line number breakpoint), the relevant file name (FileName-2 522), the relevant line number (BP-2-LineNo 523), and any other information that debug engine 300 needs to properly set the second breakpoint.

In response to receiving second BP request 458, debug engine 300 performs actions that include: (i) setting the second breakpoint (not shown in the Figures) in AUT 145 in accordance with information included in the second BP request; and (ii) pre-fetching disassembly code corresponding to the second breakpoint.

In further response to second BP request 458, debug engine 300 generates, and sends to debug GUI 132, second BP reply 460. Second BP reply 460 includes BP-2 520 which is a data packet of information pertaining to the second breakpoint.

Figure 7:
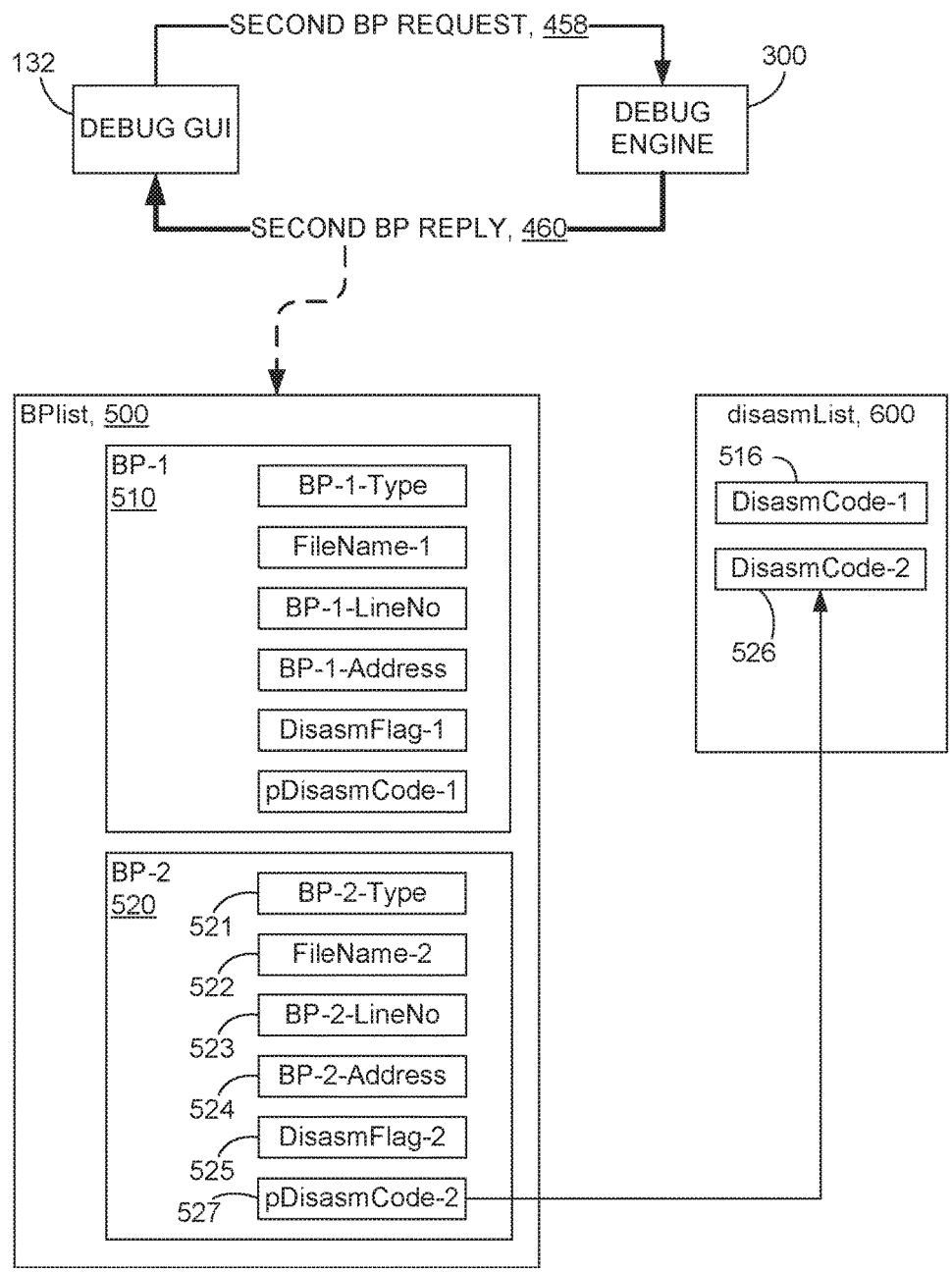
FIG. 7 is a functional block diagram showing a portion of machine logic (for example, software) in accordance with at least one embodiment of the present invention.

Content in BP-2 520 will now be discussed with respect to FIG. 7. BP-2 520 includes at least one of the following with respect to the second breakpoint: (i) BP-2-Type 521 (to indicate the type of the second breakpoint); (ii) FileName-2 522 (filename of the module in which the second breakpoint is set); (iii) BP-2-LineNo 523 (line number at which the second breakpoint is set); (iv) BP-2-Address 524 (memory address at which the second breakpoint is set); (v) DisasmFlag-2 525 (a Boolean flag to keep track of whether the disassembly code corresponding to the second breakpoint is available); (vi) DisasmCode-2 526 (the pre-fetched disassembly code segment corresponding to the second breakpoint) and/or pDisasmCode-2 527. Debug GUI 132 stores BP-2 520 in BPlist 500.

Debug GUI 132 performs the following actions with respect to the second breakpoint: (i) marks DisasmCode-2 526 as "available", by setting DisasmFlag-2 525 to "TRUE"; (ii) stores DisasmCode-2 526, and references it as being a member of disasmList 600; and (iii) sets a second pointer (pDisasmCode-2 527) in BP-2 520 to point to an address in memory where DisasmCode-2 526 is stored.

For each new breakpoint, debug GUI 132 compares the disassembly code segment of the new breakpoint with disassembly code segments previously obtained. Alternatively, the debug GUI compares the respective addresses of the new breakpoint and previously set breakpoints. If the respective disassembly code segments (and/or the respective breakpoint addresses) are the same: (i) the respective pointers are set to point to the same disassembly code segment; and (ii) the disassembly code segment, having previously been pre-fetched, is not fetched again and not duplicated in disasmList 600. If the disassembly code segments overlap: (i) the two disassembly code segments are merged into a merged disassembly code segment; and (ii) the pointers respectively associated with the two disassembly code segments are set to point to the merged code segment. This is further discussed below with respect to FIG. 8.

Figure 8:
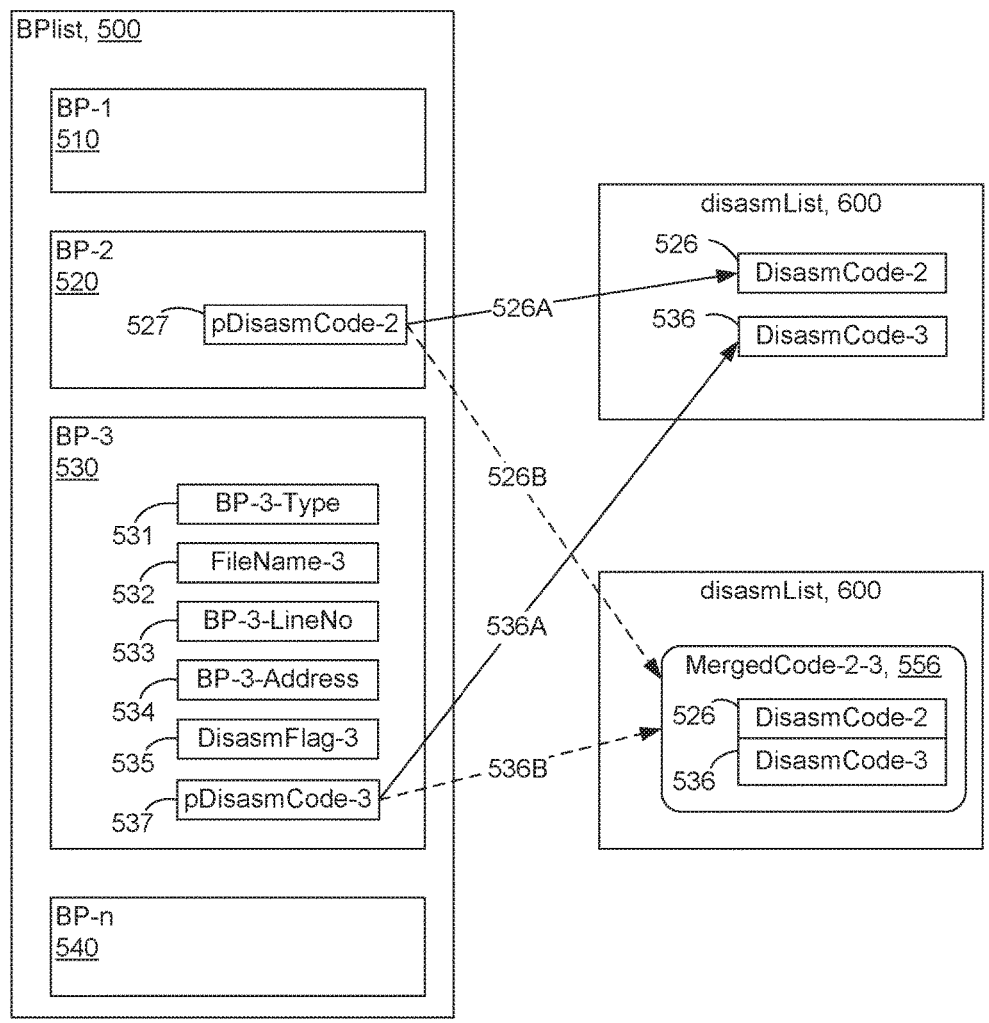
FIG. 8 is a functional block diagram showing a portion of machine logic (for example, software) in accordance with at least one embodiment of the present invention.

With reference to FIG. 8, a third breakpoint is set, in similar fashion as the first and second breakpoints were set as discussed above. In the embodiment of FIG. 8, debug engine 300 sets the third breakpoint (of unspecified type) and sends, to debug GUI 132, a data packet BP-3 530. Debug GUI 132 stores BP-3 530 in BPlist 500.

BP-3 530 includes information similar to the information included in BP-1 510 and BP-2 520 as discussed above with reference respectively to FIGS. 4 and 7. More particularly, BP-3 530 has data pertaining to the third breakpoint, including at least one of the following: (i) BP-3-Type 531 (to indicate the type of the breakpoint); (ii) FileName-3 532 (file name of the module in which the breakpoint is set); (iii) BP-3-LineNo 533 (line number at which the breakpoint is set); (iv) BP-3-Address 534 (memory address at which the breakpoint is set); (v) DisasmFlag-3 535 (a Boolean flag to keep track of whether the disassembly code corresponding to the third breakpoint is available); and/or (vi) DisasmCode-3 536 (the pre-fetched disassembly code segment corresponding to the breakpoint). Debug GUI 132 stores BP-3 530 in BPlist 500.

Debug GUI 132 performs the following actions with respect to the third breakpoint: (i) marks DisasmCode-3 536 as "available", by setting DisasmFlag-3 535 to "TRUE"; (ii) stores DisasmCode-3 536, and references it as being a member of disasmList 600; and (iii) sets a third pointer (pDisasmCode-3 537) in BP-3 530, to point to an address in memory where DisasmCode-3 536 is stored.

BPlist 500 and disasmList 600, as shown in FIG. 8, respectively include BP-n 540 and DisasmCode-n. BP-n 540 represents information corresponding to any number of additional breakpoints. DisasmList 600 represents disassembly code corresponding to any number of additional breakpoints.

With respect to the disassembly code segments in disasmList 600 (for example DisasmCode-1, DisasmCode-2, etc.), if an AUT module (or the whole AUT) corresponding to a disassembly code segment in disasmList 600 is re-compiled, the corresponding disassembly code segment(s) are discarded and replaced with newly pre-fetched disassembly code segment(s), derived and/or based on the re-compiled AUT module.

Still referring to FIG. 8, if two disassembly code segments (for example, DisasmCode-2 526 and DisasmCode-3 536) overlap, the debug GUI merges the two overlapping disassembly code segments into a merged disassembly code segment. In the present example, debug GUI 132 merges DisasmCode-2 526 and DisasmCode-3 536 into MergedCode-2-3, 556. Further, debug GUI modifies pDisasmCode-2 (which previously pointed to DisasmCode-2 526 (solid arrow 526A)), to point to MergedCode-2-3, 556 (dashed arrow 526B). Further, debug GUI modifies pDisasmCode-3 (which previously pointed to DisasmCode-3 536 (solid arrow 536A)), to point to MergedCode-2-3, 556 (dashed arrow 536B). In some embodiments of the present invention (not shown in the Figures), the merging process proceeds as follows: (i) DisasmCode-3 536 is merged into DisasmCode-2 526; (ii) pDisasmCode-2 527 continues to point to DisasmCode-2 526; and (iii) pDisasmCode-3 537 is updated to point to DisasmCode-2 526.

Figure 9:
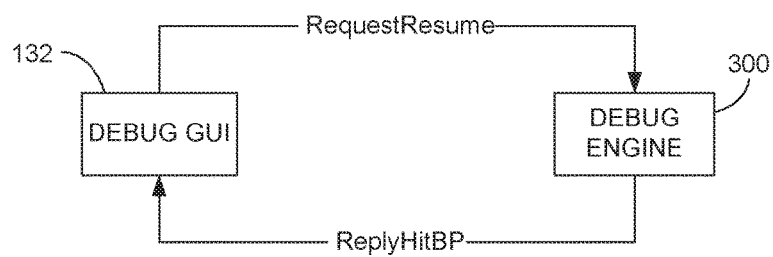
FIG. 9 is a functional block diagram showing a portion of machine logic (for example, software) in accordance with at least one embodiment of the present invention.
Figure 9:
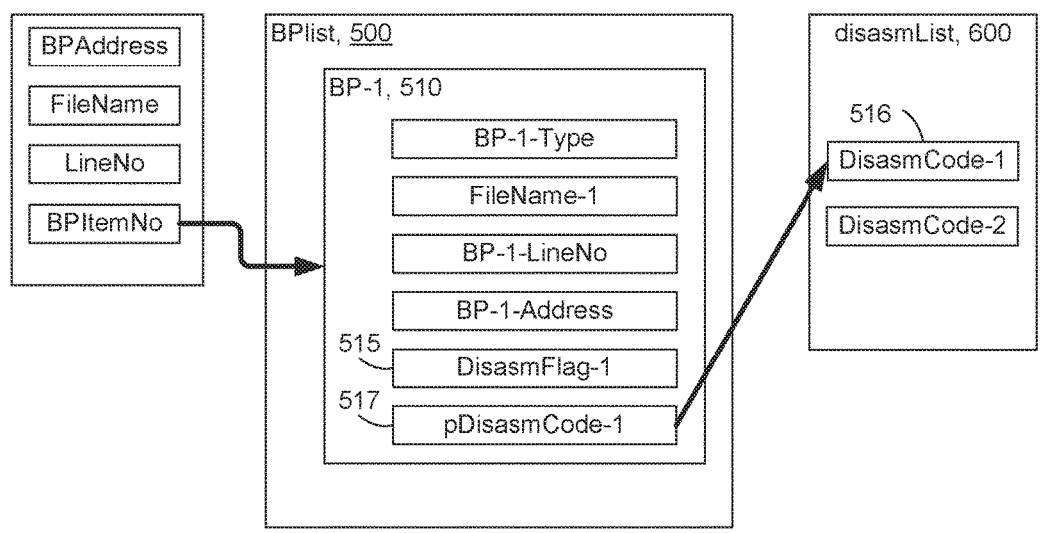

Referring now to FIG. 9, discussion turns to operation of the application under test (AUT 145, FIG. 1) in accordance with some embodiments of the present invention. In the embodiment of FIG. 9, when a breakpoint (such as the first breakpoint) is reached during execution of AUT 145, debug GUI 132 checks DisasmFlag-1 515 to determine whether the disassembly code corresponding to the breakpoint (DisasmCode-1 516) is available. Availability of DisasmCode-1 516 is signaled by the status of disasmFlag-1 515 (the flag). If the flag is set to TRUE (meaning DisasmCode-1 516 is available), debug GUI 132 displays the content of disasmCode-1 516, which is pointed to by pDisasmCode-1 517 of BP-1 510. If the flag is not set to TRUE (meaning the disassembly code is not available), debug GUI 132 sends a request to debug engine 300, seeking to obtain the disassembly code segment DisasmCode-1 516 corresponding to the current value of the program counter. After receiving a data packet containing the disassembly code segment, GUI 132 displays the content of disasmCode-1 516. (The foregoing may be analogous to "lazy binding", a method by which a dynamic linker (dll) defers symbol lookups for a function call until the first time the function is called. In the case under discussion (flag=FALSE), GUI 132 defers fetching of the disassembly code until the first time the code is needed.)

Figure 10:
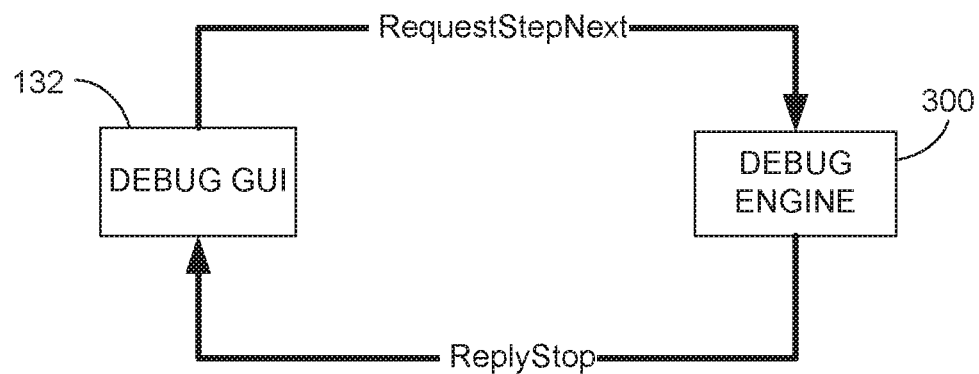
FIG. 10 is a functional block diagram showing a portion of machine logic (for example, software) in accordance with at least one embodiment of the present invention.
Figure 10:
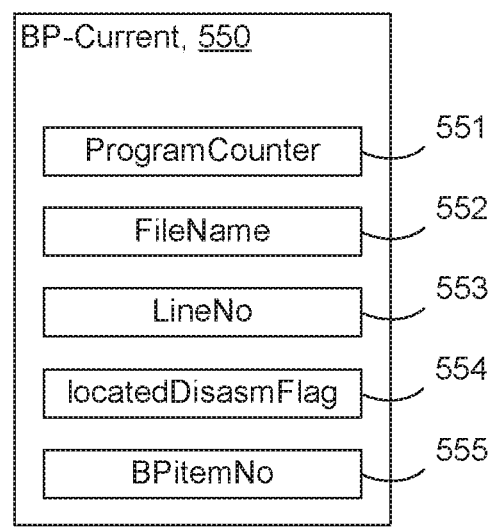
Figure 11:
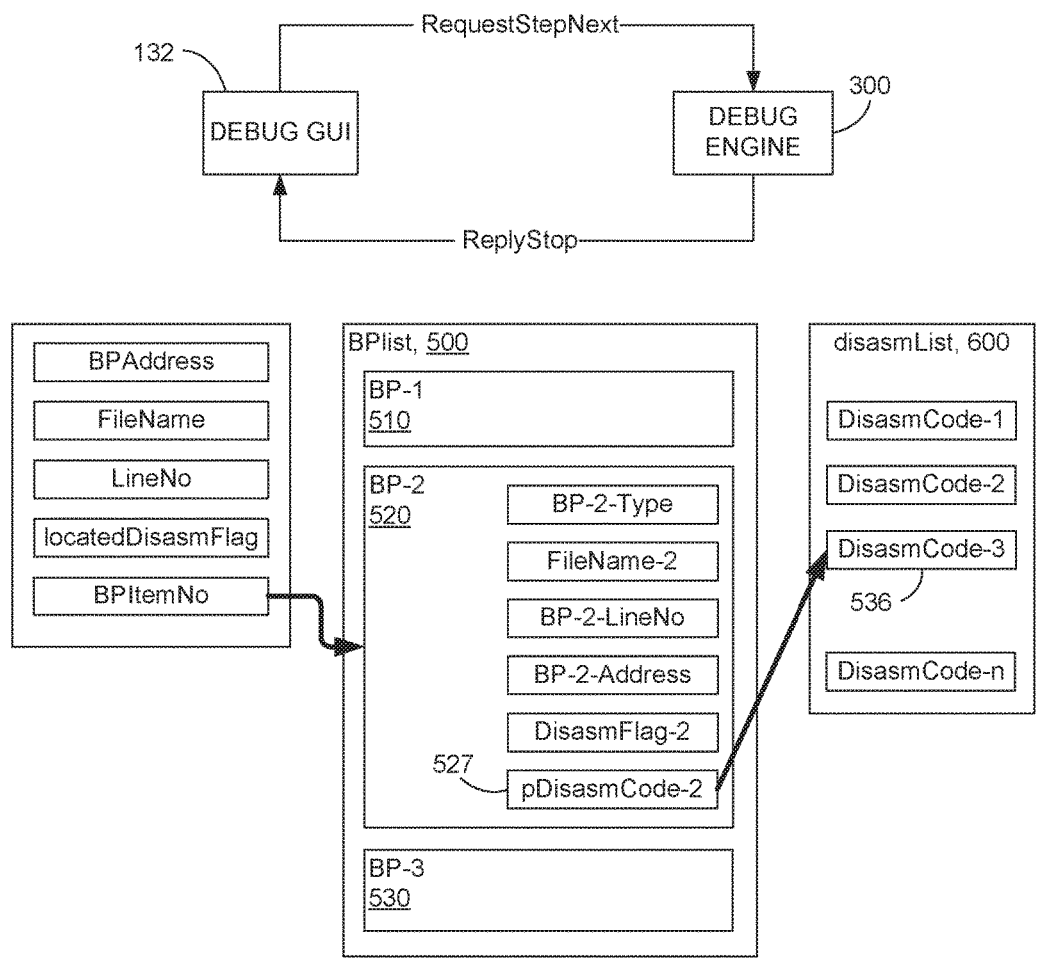
FIG. 11 is a functional block diagram showing a portion of machine logic (for example, software) in accordance with at least one embodiment of the present invention.

Referring now to FIGS. 10 and 11, if debug engine 300 stops as a result of certain commands (commands such as step, next, stepi, or nexti), there are at least two scenarios that can occur in some embodiments of the present invention. These scenarios are discussed below, in the following few paragraphs, as scenario 1 and scenario 2.

With respect to FIG. 10, scenario 1 occurs when the disassembly code segment is fetched according to the routine or the module. Debug engine 300 engine examines BPList 500 (see FIG. 9) to attempt to identify a routine within which the current program counter (PC) is located. If the debug engine is able to identify, based on information in BPList 500, a routine within which the current PC is located, the debug engine returns BP-Current 550 to debug GUI 132. BP-Current 550 includes the following information: ProgramCounter 551 (the value of the current PC); FileName 552; LineNo 553; locatedDisasmFlag 554 (set to TRUE); and/or BPItemNo 555.

With respect to FIG. 11, in scenario 2, a disassembly code segment, including M lines of disassembly code, is fetched and the disassembly window of debug GUI 132 shows N lines of the M lines of disassembly code.

Debug engine 300 determines, based on information in BPList 500 (see FIG. 9), the routine within which the current PC is located. The debug engine determines whether line number L is located within disassembly code segment, B (LineNo of BPItem) as follows:

$$[L+N/2 \leq B+M/2] \&\& [L-N/2 \geq B-M/2] \quad [\text{Eq. 1}]$$

Where: L is the line number of the source code corresponding to (that is, located by) the current program counter; B is the line number at which the breakpoint is set; and "&&" is the logical AND operator.

If [Eq. 1] evaluates to TRUE, and locatedDisasmFlag 554 is set to TRUE, the breakpoint is identified. In the example of FIG. 10, the current breakpoint (BP-Current 550) is the second breakpoint, that is the breakpoint corresponding to second BP request 458 (see FIG. 6). Data associated with the second breakpoint is included in BP-2 520 (see FIG. 7). BPItemNo 555 is set to identify BP-2 520 as being associated with the current breakpoint. Debug engine 300 sends, to debug GUI 132, BP-Current 550 which includes the following information: ProgramCounter 551; FileName 552; LineNo 553; locatedDisasmFlag 554; and/or BPitemNo 555. Debug GUI 132 displays the content of DisasmCode-3 536, which is a pre-fetched disassembly code segment corresponding to BP-2 520 (see FIG. 8).

In some embodiments of the present invention, if a user sets a line number breakpoint (that is, line number is L and the breakpoint, for example, is identified as the second breakpoint), Debug GUI 132 will first search through the disasmList 600 to attempt to determine which pre-fetched disassembly segment is located. If found (for example DisasmCode-3 536), then debug GUI 132 sets pDisasmCode-2 of BPItem2 to point to pre-fetched DisasmCode-3, thereby avoiding the need to get the disassembly code segment, at runtime, from Debug Engine 300, with its attendant latency and network traffic.

If [Eq. 1] evaluates to FALSE, and/or locatedDisasmFlag 554 is set to FALSE, Debug GUI 132 sends a request to Debug Engine 300 to fetch a disassembly code segment, at runtime, including M lines of disassembly code, N lines of which debug GUI 132 then displays in the disassembly window. Alternatively, in some embodiments of the present invention, Debug Engine 300 sends the disassembly code segment to an automated debug analysis system (not shown in the Figures).

Some embodiments of the present invention may include one, or more, of the following features, characteristics and/or advantages: (i) reduces the latency associated with acquiring the disassembly code when the application is very large and/or when breakpoints are repeatedly hit during remote debugging; (ii) in remote debugging, increases the performance with respect to displaying disassembly code, particularly when the application under test is very large; and/or (iii) improves debugging performance when the user changes from source code view to disassembly view.

In remote debugging, an application under test (AUT) runs on a computer system that is different from the computer system on which a debug GUI is running. A debug GUI processes and displays, automatically and immediately (meaning without a degree of latency that would be considered excessive by a user), a great deal of information in various view windows, without requiring a great deal of debugging command inputs. If a breakpoint is hit, the debug GUI may concurrently fetch and display the application's disassembly code and other information (such as variables, memory contents, frame contents, etc.) If the AUT is very large, for example, 10,000 lines of code or more, remote debugging tends to be slower, and latency tends to be longer as compared to debugging relatively smaller applications. This is because the debug GUI and the debug engine perform a great deal of actions and many data packets need to be communicated through the network in performance of the actions.

For example, in some embodiments of the present invention, when a breakpoint in an AUT is hit, the debug GUI in response sends requests and processes replies from the debug engine. Many view windows are automatically opened to display various aspects of the AUT (such as variable values, memory contents, disassembly code, stack views, etc.). If the AUT is very large, data packets returned by the debug engine to the debug GUI are very large. For example, a data packet may include the relevant breakpoint information, local and customized variable values, variable types, disassembly code text, memory contents and so on. In some embodiments, the disassembly code text is the largest part of the data packet. Embodiments, having pre-fetched the disassembly code (previous to the breakpoint being hit): (i) significantly reduce the request/reply traffic between the debug GUI and the debug engine; and (ii) with respect to the disassembly code segment, the debug GUI, having pre-fetched the disassembly code segment at the time that the breakpoint was set, does not have to fetch the disassembly code when the breakpoint is hit.

Some embodiments of the present invention may include one, or more, of the following features, characteristics and/or advantages: (i) leverages the fact that disassembly code is does not change during debugging, unless the application is recompiled; (ii) pre-fetching disassembly code for remote software debugging reduces the request/reply and data traffic between the debug GUI 132 and the debug engine when a breakpoint is hit; (iii) when the debug GUI sends a request to the debug engine to set a breakpoint, and the setting is successful, the debug engine returns a data packet the debug GUI comprising the disassembly code related to the breakpoint address; (iv) the debug GUI marks the disassembly code as "available"; (v) other breakpoint information (such as breakpoint type, filename, line number, address, etc.), is sent to the debug GUI.

When a breakpoint is hit (or debug engine 300 stops at the breakpoint by step/next), the debug GUI 132 determines if the disassembly code segment is available. In some embodiments of the present invention, this is determined by examining the state of the corresponding disassembly flag (for example, DisasmFlag-2 525 corresponding to BP-2 520 (see FIG. 7)). If the disassembly flag is set to TRUE, the disassembly code segment is available and conversely, if the flag is set to FALSE, the disassembly code segment is not available. If the disassembly code segment is available, debug GUI 132 does not need to request the disassembly code from the debug engine, but rather can display the pre-fetched code, along with other available information.

If the breakpoint had been set on a "debug-able" lazy-binding dynamic library (dll) which was not loaded at the time when the breakpoint was set, the first time the breakpoint is hit, debug engine 300 sends to debug GUI 130 a data packet that includes the disassembly code. The debug GUI marks the disassembly code as "available" (by setting the corresponding disassembly flag to TRUE) within the breakpoint information. If the same breakpoint is hit again, or the debug engine stops by step/next at the same breakpoint, since the disassembly code has been pre-fetched and is available, the debug GUI does not need to request it again from the debug engine. A potential advantage of this method is improved performance of disassembly code segment view during remote debugging, particularly so when the application is large and/or breakpoints are hit repeatedly.

Figure 12:
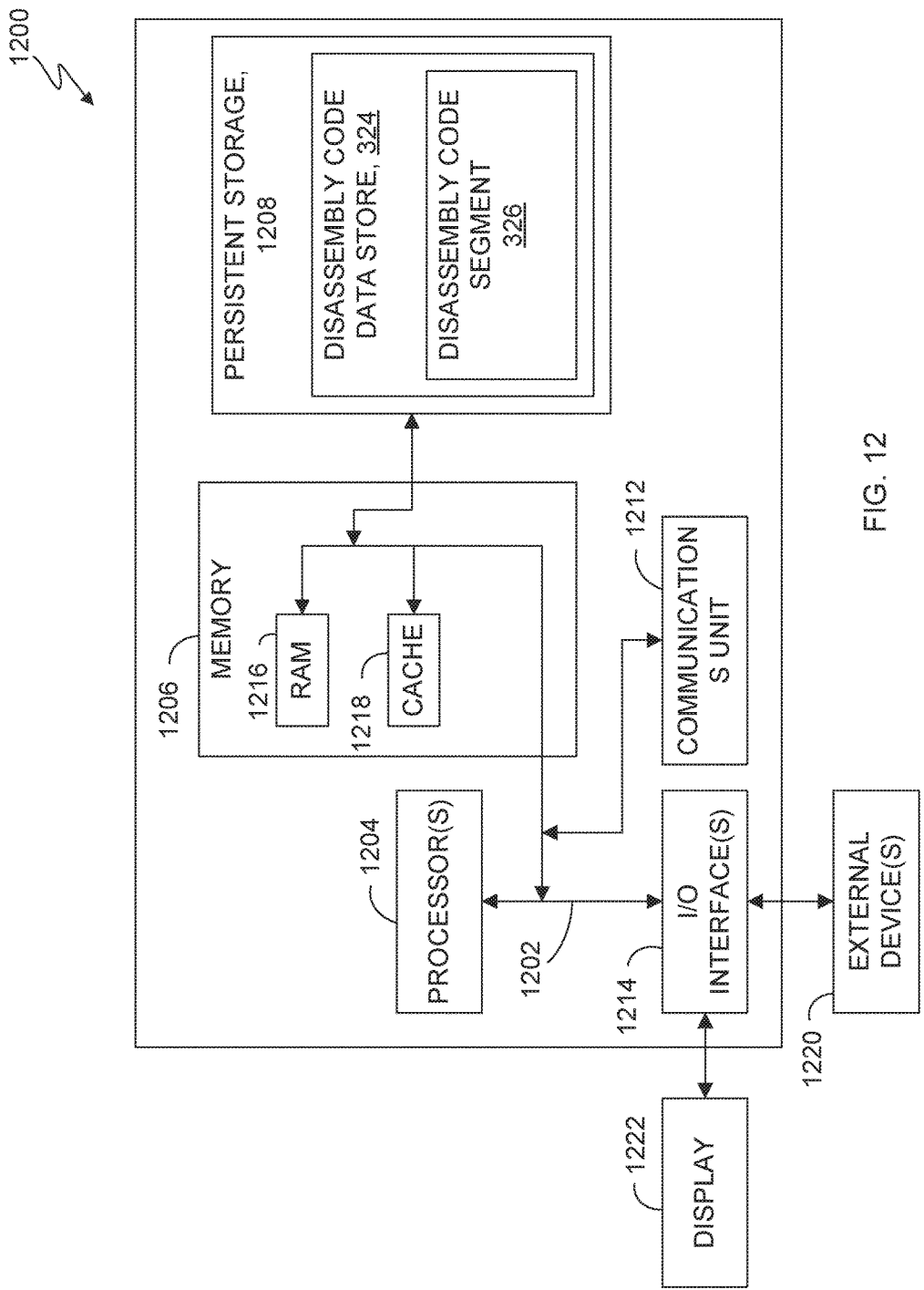
FIG. 12 is a block diagram depicting components of a computer, in accordance with at least one embodiment of the present invention.

FIG. 12 depicts a block diagram of components of computer 1200 in accordance with an illustrative embodiment of the present invention. It should be appreciated that FIG. 12 provides only an illustration of one implementation and does not imply any limitations with regard to the environments in which different embodiments may be implemented. Many modifications to the depicted environment may be made.

As depicted, the computer 1200 includes communications fabric 1202, which provides communications between computer processor(s) 1204, memory 1206, persistent storage 1208, communications unit 1212, and input/output (I/O) interface(s) 1214. Communications fabric 1202 can be implemented with any architecture designed for passing data and/or control information between processors (such as microprocessors, communications and network processors, etc.), system memory, peripheral devices, and any other hardware components within a system. For example, communications fabric 1202 can be implemented with one or more buses.

Memory 1206 and persistent storage 1208 are computer-readable storage media. In this embodiment, memory 1206 includes random access memory (RAM) 1216 and cache memory 1218. In general, memory 1206 can include any suitable volatile or non-volatile computer-readable storage media.

One or more programs may be stored in persistent storage 1208 for access and/or execution by one or more of the respective computer processors 1204 via one or more memories of memory 1206. In this embodiment, persistent storage 1208 includes a magnetic hard disk drive. Alternatively, or in addition to a magnetic hard disk drive, persistent storage 1208 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 1208 may also be removable. For example, a removable hard drive may be used for persistent storage 1208. Other examples include optical and magnetic disks, thumb drives, and smart cards that are inserted into a drive for transfer onto another computer-readable storage medium that is also part of persistent storage 1208.

Communications unit 1212, in these examples, provides for communications with other data processing systems or devices. In these examples, communications unit 1212 includes one or more network interface cards. Communications unit 1212 may provide communications through the use of either or both physical and wireless communications links.

I/O interface(s) 1214 allows for input and output of data with other devices that may be connected to computer 1200. For example, I/O interface 1214 may provide a connection to external devices 1220 such as a keyboard, keypad, a touch screen, and/or some other suitable input device. External devices 1220 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 1208 via I/O interface(s) 1214. I/O interface(s) 1214 also connect to a display 1222.

Display 1222 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to optimal explain the principles of the embodiment, the practical application or technical improvement over technologies found in the marketplace, or to enable others of ordinary skill in the art to understand the embodiments disclosed herein.

What is claimed is:

1. A method for pre-fetching disassembly code comprising:
   receiving, from a remote computer system, a program code data set;
   receiving user input including a first breakpoint address;
   pre-fetching a first disassembly code segment, from the remote computer system running an application under test, based at least in part on the program code data set, and further based at least in part on the first breakpoint address, to produce a pre-fetched first disassembly code segment;
   storing the pre-fetched first disassembly code segment in a local computer system running a debug analysis system;
   receiving user input including a second breakpoint address;
   pre-fetching a second disassembly code segment, from the remote computer system running the application under test, based at least in part on the program code data set, and further based at least in part on the second breakpoint address to produce a pre-fetched second disassembly code segment;
   receiving information indicating that execution of the program code data set has reached the first breakpoint address;

in response to receiving information indicating that execution of the program code data set has reached the first breakpoint address, sending the pre-fetched first disassembly code segment to the debug analysis system running on the local computer system;

determining that the pre-fetched second disassembly code segment overlaps the pre-fetched first disassembly code segment;

in response to determining that the pre-fetched second disassembly code segment overlaps the pre-fetched first disassembly code segment, merging the pre-fetched second disassembly code segment with the pre-fetched first disassembly code segment to create a merged disassembly code segment;

receiving information indicating that execution of the program code data set has reached the second breakpoint address; and in response to receiving information indicating that execution of the program code data set has reached the second breakpoint address, sending the merged disassembly code segment to the debug analysis system running on the local computer system.

2. The method of claim 1 further comprising:

storing the pre-fetched second disassembly code segment in the local computer system;

determining that the pre-fetched second disassembly code segment is a subset of the pre-fetched first disassembly code segment;

receiving information indicating that execution of the program code data set has reached the second breakpoint address; and in response to (i) determining that the pre-fetched second disassembly code segment is a subset of the pre-fetched first disassembly code segment, and (ii) receiving information indicating that execution of the program code data set has reached the second breakpoint address, sending the pre-fetched first disassembly code segment to the debug analysis system running on the local computer system.

3. A computer program product comprising a computer readable storage medium having stored thereon instructions to perform:

receiving, from a remote computer system, a program code data set;

receiving user input including a first breakpoint address;

pre-fetching a first disassembly code segment, from the remote computer system running an application under test, based at least in part on the program code data set, and further based at least in part on the first breakpoint address, to produce a pre-fetched first disassembly code segment;

storing the pre-fetched first disassembly code segment in a local computer system running a debug analysis system;

receiving user input including a second breakpoint address;

pre-fetching a second disassembly code segment, from the remote computer system running the application under test, based at least in part on the program code data set, and further based at least in part on the second breakpoint address to produce a pre-fetched second disassembly code segment;

receiving information indicating that execution of the program code data set has reached the first breakpoint address;

in response to receiving information indicating that execution of the program code data set has reached the first breakpoint address, sending the pre-fetched first disassembly code segment to the debug analysis system running on the local computer system;

determining that the pre-fetched second disassembly code segment overlaps the pre-fetched first disassembly code segment;

in response to determining that the pre-fetched second disassembly code segment overlaps the pre-fetched first disassembly code segment, merging the pre-fetched second disassembly code segment with the pre-fetched first disassembly code segment to create a merged disassembly code segment;

receiving information indicating that execution of the program code data set has reached the second breakpoint address; and in response to receiving information indicating that execution of the program code data set has reached the second breakpoint address, sending the merged disassembly code segment to the debug analysis system running on the local computer system.

4. The computer program product of claim 3, the program instructions further comprising instructions to perform:

storing the pre-fetched second disassembly code segment in the local computer system;

determining that the pre-fetched second disassembly code segment is a subset of the pre-fetched first disassembly code segment;

receiving information indicating that execution of the program code data set has reached the second breakpoint address; and in response to (i) determining that the pre-fetched second disassembly code segment is a subset of the pre-fetched first disassembly code segment, and (ii) receiving information indicating that execution of the program code data set has reached the second breakpoint address, sending the pre-fetched first disassembly code segment to the debug analysis system running on the local computer system.

5. A computer system comprising:

one or more computer processors;

one or more computer-readable storage media;

program instructions stored on the computer-readable storage media for execution by at least one of the one or more processors, the program instructions comprising instructions to perform:

receiving, from a remote computer system, a program code data set;

receiving user input including a first breakpoint address;

pre-fetching a first disassembly code segment, from the remote computer system running an application under test, based at least in part on the program code data set, and further based at least in part on the first breakpoint address, to produce a pre-fetched first disassembly code segment;

storing the pre-fetched first disassembly code segment in a local computer system running a debug analysis system;

receiving user input including a second breakpoint address;

pre-fetching a second disassembly code segment, from the remote computer system running the application under test, based at least in part on the program code data set, and further based at least in part on the second breakpoint address to produce a pre-fetched second disassembly code segment;

receiving information indicating that execution of the program code data set has reached the first breakpoint address;

in response to receiving information indicating that execution of the program code data set has reached the first breakpoint address, sending the pre-fetched first disassembly code segment to the debug analysis system running on the local computer system;

determining that the pre-fetched second disassembly code segment overlaps the pre-fetched first disassembly code segment;

in response to determining that the pre-fetched second disassembly code segment overlaps the pre-fetched first disassembly code segment, merging the pre-fetched second disassembly code segment with the pre-fetched first disassembly code segment to create a merged disassembly code segment;

receiving information indicating that execution of the program code data set has reached the second breakpoint address; and in response to receiving information indicating that execution of the program code data set has reached the second breakpoint address, sending the merged disassembly code segment to the debug analysis system running on the local computer system.

6. The computer system of claim 5, the program instructions further comprising instructions to perform:

storing the pre-fetched second disassembly code segment in the local computer system;

determining that the pre-fetched second disassembly code segment is a subset of the pre-fetched first disassembly code segment;

receiving information indicating that execution of the program code data set has reached the second breakpoint address; and in response to (i) determining that the pre-fetched second disassembly code segment is a subset of the pre-fetched first disassembly code segment, and (ii) receiving information indicating that execution of the program code data set has reached the second breakpoint address, sending the pre-fetched first disassembly code segment to the debug analysis system running on the local computer system.

* * * * *